United States Patent
Rutz

[11] Patent Number: 5,871,566
[45] Date of Patent: Feb. 16, 1999

[54] VENTED METERING PUMP

[75] Inventor: Klaus Rutz, Vachendorf, Germany

[73] Assignee: Lang Apparatebau GmbH, Siegsdorf, Germany

[21] Appl. No.: 836,400

[22] PCT Filed: Nov. 2, 1995

[86] PCT No.: PCT/EP95/04283

§ 371 Date: May 9, 1997

§ 102(e) Date: May 9, 1997

[87] PCT Pub. No.: WO96/15370

PCT Pub. Date: May 23, 1996

[30] Foreign Application Priority Data

Nov. 9, 1994 [DE] Germany .......................... 44 39 962.6

[51] Int. Cl.$^6$ ................................................. B01D 19/00
[52] U.S. Cl. ................................................... 96/6; 95/46
[58] Field of Search ........................................ 95/46; 96/6

[56] References Cited

U.S. PATENT DOCUMENTS

| | | | |
|---|---|---|---|
| 3,487,751 | 1/1970 | Meijer et al. | 96/6 X |
| 3,631,654 | 1/1972 | Riely et al. | 96/6 |
| 3,751,879 | 8/1973 | Allington | 96/6 X |
| 3,778,971 | 12/1973 | Granger et al. | 96/6 |
| 4,030,495 | 6/1977 | Virag | 128/214.2 |
| 4,190,426 | 2/1980 | Ruschke | 96/6 |
| 4,325,715 | 4/1982 | Bowman et al. | 96/6 |
| 4,445,884 | 5/1984 | Kurtz et al. | 96/6 X |
| 4,865,525 | 9/1989 | Kern | 417/307 |
| 4,990,054 | 2/1991 | Janocko | 96/6 X |
| 5,053,060 | 10/1991 | Kopf-Sill et al. | 95/46 |
| 5,104,810 | 4/1992 | Birbara et al. | 95/46 X |
| 5,106,754 | 4/1992 | Steele et al. | 95/46 X |
| 5,383,483 | 1/1995 | Shibano | 96/6 X |
| 5,425,803 | 6/1995 | van Schravendijk et al. | 96/6 X |
| 5,584,914 | 12/1996 | Senoo et al. | 96/6 |
| 5,588,809 | 12/1996 | Klein et al. | 417/283 |
| 5,695,545 | 12/1997 | Cho et al. | 95/46 |

FOREIGN PATENT DOCUMENTS

| | | | |
|---|---|---|---|
| 2 330 883 | 6/1977 | France . | |
| 945 801 | 1/1956 | Germany . | |
| 28 03 471 | 5/1979 | Germany . | |
| 34 10 305 | 9/1985 | Germany . | |
| 36 31 984 | 12/1987 | Germany . | |
| 42 41 030 | 6/1994 | Germany . | |
| 63-111909 | 5/1988 | Japan | 96/6 |
| 63-218215 | 9/1988 | Japan | 95/46 |
| 1-038105 | 2/1989 | Japan | 95/46 |
| 3-118802 | 5/1991 | Japan | 95/46 |
| 4-118004 | 4/1992 | Japan | 95/46 |
| 4-135604 | 5/1992 | Japan | 96/6 |
| 4-171005 | 6/1992 | Japan | 95/46 |
| 4-290502 | 10/1992 | Japan | 95/46 |
| 5-177104 | 7/1993 | Japan | 95/46 |
| 6-182325 | 7/1994 | Japan | 95/46 |
| 6-182326 | 7/1994 | Japan | 95/46 |
| 7 703 057 | 9/1978 | Netherlands . | |

*Primary Examiner*—Robert Spitzer
*Attorney, Agent, or Firm*—Ernest G. Szoke; Wayne C. Jaeschke; Kenneth Watov

[57] ABSTRACT

A pump for metering liquids out of a tank into a delivery line, includes, fitted on the output side, an air-purge device which is designed to separate off gas, in particular air, entrained by the pressurized liquid being conveyed and to lead the gas away into a gas-collection space which is at a pressure lower than that of the liquid. In order to ensure reliable purging, even with corrosive liquids, the pump is designed so that the purging device has a semipermeable membrane, on one side of which the pressurized liquid acts, the other side being in direct contact with the gas-collection space.

8 Claims, 1 Drawing Sheet

VENTED METERING PUMP

BACKGROUND

1. Field of the Invention

This invention relates generally to a metering pump for the measured delivery of liquids from a supply into a metering pipe, and more particularly to a metering pump that is vented to permit pressurized liquid being pumped to be removed in a degassing space where the pressure is below the liquid pressure and discharged.

2. Discussion of Related Art

In the pumping and metering of liquids, the reproducibility of delivery and the intake behavior can be seriously affected by outgassing of the liquid. Gas present in the liquid to be delivered is compressed during the compression stroke and can expand again during the following suction stroke. Accordingly, only part—if any—of the liquid is actually pumped. If the metering pump operates with a low stroke volume, even small amounts of gas can lead to serious metering errors. In addition, gas can be compressed in the pump chamber during pumping and can expand during the intake of liquid so that the intake and hence the delivery of the liquid by the metering pump is impaired. Accordingly, it is standard practice to fit metering pumps with a venting system.

A metering pump with the features mentioned at the beginning is known from DE 42 41 030 C1. The venting system comprises a vent valve located between a pressure valve of the pump chamber of the metering pump and the output side of the pump where there is a pressure valve leading to a metering pipe. The vent valve opens during the suction stroke and closes during the compression stroke. During the suction stroke when the pressure valve is closed, gas is able to escape through the opened vent valve. Although this metering pump has proved successful in practice, its use for aggressive or sensitive liquids can lead to difficulties, particularly with regard to the moving valve parts.

SUMMARY OF THE INVENTION

By contrast, the problem addressed by the present invention is to improve a metering pump with the features mentioned above in such a way that its venting system performs the necessary degassing function without the use of parts, for example moving valve parts, whose function is dependent on the more or less aggressive properties of the liquid to be transported.

According to the invention, the solution to this problem is provided in one embodiment by a venting system comprising a semipermeable membrane which, on one side, is exposed to the pressurized liquid and which, on its other side, immediately adjoins the degassing space.

It is important to the invention that the semipermeable membrane used is one which continuously and effectively separates the liquid to be transported from the degassing space. Accordingly, this semipermeable membrane is capable of further transporting the liquid in the manner of a pipe wall because it represents an impenetrable obstacle to the liquid. However, the gas transported by the liquid is able to diffuse through the membrane so that the gas phase is separated. The semipermeable membrane can be made resistant to pressure and chemicals so that aggressive properties of the pressurized liquid to be transported have no effect on the function of the membrane. So far as the liquid is concerned, the venting system equipped with this membrane forms a completely closed-off area between the metering pump and the metering pipe. There is no need for any mechanisms operating in dependence upon the pump frequency. On the contrary, the membrane acts permanently, even during the compression stroke of the metering pump, which is of advantage in terms of effective degassing of the liquid to be transported. In addition, the membrane provides for considerable structural simplification of the region between the metering pump and the metering pipe, all by reducing the number of necessary parts and using parts which present no sealing or durability problems as is the case with the known venting systems with valve constructions. The semipermeable membrane can readily be made and fitted with such a level of pressure resistance that interference with the delivery volume by elastic behavior of the membrane is ruled out but, in any event, can be kept within predetermined tolerable limits. The effectiveness of the venting system presupposes that the gas throughflow rate of the semipermeable membrane is dependent on a pressure difference on both sides of the membrane. In other words, the liquid pressure should be greater than the pressure prevailing in the degassing space. However, if only a low degassing rate is required, the pressure prevailing in the degassing space may be substantially equal to the liquid pressure of the transported liquid.

In many cases, the liquids to be transported contain hydrophobic compounds or at least partly hydrophobic compounds, for example surfactants. In this case, the membrane is advantageously oleophobic to avoid blockage of the fine pores of the membrane with the liquid to be metered.

To enable the separating properties of the semipermeable membrane to be optimally utilized, i.e. to achieve a high gas removal rate, the metering pump may be designed in such a way that the venting pressure of the degassing space is always lower to a predetermined extent than the pressure of the transported liquid. The resulting diffusion pressure gradient produces the intensive degassing required throughout the delivery phase to the extent determined in advance by the pressure difference. A high gas removal rate is thus obtained. If this is not necessary, the effectiveness of the venting system may also be used to shorten the residence time of the liquid in the venting system or correspondingly to increase the throughput of the metering system.

The degassing space is preferably a gas-filled space. The gas let through by the semipermeable membrane may readily mix with the gas of the degassing space and can escape or be pumped off therefrom.

The gas let through by the semipermeable membrane can readily escape automatically if the degassing space is at atmospheric pressure. Accordingly, the metering pump may also be designed in such a way that the degassing space is in direct gas discharge communication with the environment surrounding the metering pump. In this case, no other mechanical means are required to remove the gas from the degassing compartment.

However, it may be desirable for the degassing space and the environment around the pump not to be in direct pressure communication, for example in order to prevent variations in atmospheric pressure affecting the degassing behavior of the venting system and hence the gas content of the liquid to be metered. In this case, the metering pump is designed in such a way that the degassing space is in gas discharge communication with the environment around the pump through a shut-off element which prevents air from penetrating. In another embodiment of the invention the venting system, the shut-off element allows gas emanating from the liquid to be removed, but prevents gas flow in the opposite direction.

A simple construction of the metering pump which prevents air from entering the degassing space is achieved if the shut-off element is a nonreturn valve or a barrier liquid. The nonreturn valve may have a very low response pressure which differs only slightly from the atmospheric pressure. The barrier liquid may be used in a device on the lines of a siphon.

The venting system may readily be designed in such a way that it can be used in conjunction with metering pumps already in operation, i.e. spatially separated therefrom. The advantage of this is that the old metering pump can continue to be used and the new venting system can even be replaced as and when required, for example by another venting system with a different range or for maintenance purposes. However, it can also be of advantage to design the metering pump in such a way that the venting system forms an integral unit with the pump head of the metering pump. This affords advantages in terms of compactness. The total amount of material required can also be reduced. The venting system is always optimally adapted to the operation of the metering pump.

In the interest of further integration, the metering pump may also be designed in such a way that, where a diaphragm pump is used, the venting system forms an integral unit with its pump pressure valve.

Outgassing of the liquid to be pumped can also occur on the suction side of the pump. Gas also accumulates there when the supply accommodated in a storage container comes to an end unnoticed or when a suction hose is connected to a new filled storage container without venting. Accordingly, it can be of advantage to design a metering pump in such a way that, where the supply of liquid is under pressure, the metering pump is preceded on the suction side by a venting system comprising a semipermeable membrane which is exposed to the supply to be delivered and which, on its other side, immediately adjoins a degassing space where the pressure is below the pressure of the liquid supply. A construction such as this is of particular relevance when the metering pump is otherwise designed as described above, i.e. preferably has the features mentioned above. In addition, the venting system may advantageously be used when the liquid supply is already under pressure on the suction side. The pressure on the suction side is useful for degassing of the liquid by means of the semipermeable membrane. Such pressure of the liquid to be pumped might develop to a significant degree if the liquid supply is situated at a higher level than the metering pump. If the conditions under which the venting system is used on the suction side of the metering pump are so favorable that substantially complete degassing is achieved and there is little, if any, risk of further outgassing from the metering pump to the metering pipe, a venting system with a semipermeable membrane acting solely on the suction side of the metering pump may be sufficient.

BRIEF DESCRIPTION OF THE DRAWINGS

Examples of embodiments of the invention are described in the following with reference to the accompanying drawings, in which like items are identified by the same reference designation, wherein.

DETAILED DESCRIPTION OF THE INVENTION

Figure 1:
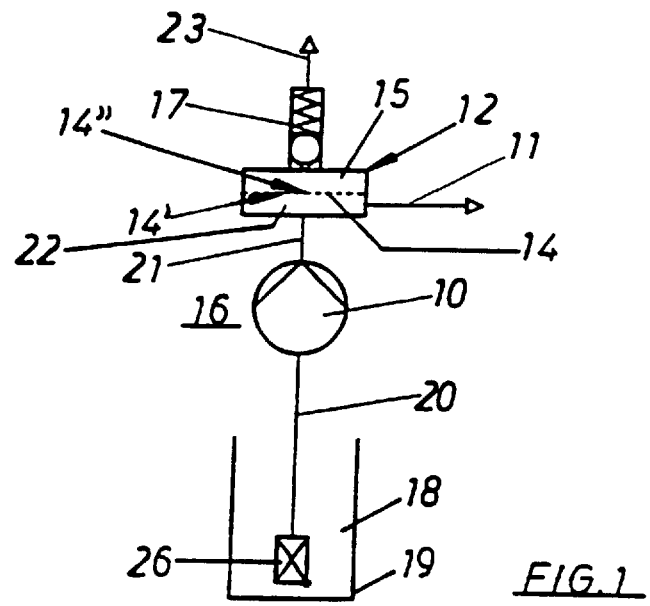
FIG. 1 schematically illustrates a metering pump with a venting system.

The metering pump 10 shown in FIG. 1 is used for the metered delivery of liquids from a supply 18 accommodated in a liquid container 19. The liquid container 19 is, for example, a drum into which is inserted a suction pipe 20 of the metering pump 10 which is provided at its end with a filter 26 to prevent unwanted particles from penetrating.

The metering pump 10 may vary in its construction. The well-known diaphragm pumps are often used although piston pumps are also suitable. Rotary pumps or gear pumps may also be used.

The metering pump 10 delivers the liquid into a metering pipe 11 which carries the liquid to the particular consumer. A pressure-retaining valve (not shown) in the form of a nonreturn valve is often arranged in the metering pipe 11, being used in one mode for precision metering of the liquid, and in another mode to keep the metering pipe full up to the metering pump 10, i.e. to avoid trickling of the liquid towards the consumer, and in addition ensuring that the liquid is unable to flow back from the consumer towards the metering pump into the region represented by the pressure-retaining valve.

Accordingly, it may be assumed that a predetermined pressure always prevails in the pressure pipe 11 when the metering pump 10 is operating or is ready for operation.

Arranged on the output side of the pump 10 is a venting system 12 which, physically, may be formed by a two-part housing whose parts include a semipermeable membrane 14 with flanges (not shown). Each side 14', 14" of the semipermeable membrane 14 faces a part of the housing. That part of the housing which is on the metering pump side is connected to a pressure pipe 21 through which the liquid delivered by the metering pump 10 is transported into a pressure chamber 22 of the venting system 12. The metering pipe 11 starts from the chamber 22.

Situated opposite the pressure chamber 22 on the other side 14" of the membrane 14 is a degassing space 15 formed by that part of the housing of the venting system 12 which is remote from the pump. The degassing space 15 is connected to a gas outlet 23.

Liquid pumped from the supply 18 by the metering pump 10 passes into the pressure chamber 22 and any gas transported with the liquid diffuses through the semipermeable membrane 14 into the degassing space 15. Under the effect of the pressure difference on both sides 14', 14" of the membrane 14, gas diffuses through the membrane 14. The gas accumulating in the degassing space 15 can flow off through the gas outlet 23 into the environment around the metering pump. There is no need for the gas outlet 23 to be continued back to the storage container 19 because no liquid enters the degassing space that would have to be returned, as can be the case with valve-equipped venting systems or as is the case with leakage-type venting systems where the gas bubbles have to be removed from the metering pipe through the permanent overflow of a non-reproducible leakage volume, resulting in pressure-, temperature- and viscosity-dependent and hence variable leakage volumes.

FIG. 1 shows a nonreturn valve 17 installed in the gas outlet 23. It is opened by a pressure which builds up in the degassing space 15 through the diffusion of gas through the membrane 14. As a result, predetermined pressure differences occur between the pressure chamber 22 and the degassing space 15, enabling the degassing process to be controlled in a predeterminable manner. By virtue of the nonreturn valve 17, air is prevented from penetrating into the degassing space 15 from the environment 16 around the pump. Such penetration of air is possible because the pressure of the transported liquid increases and falls again on the output side of the pump. As the pressure falls, air could enter the degassing space but is prevented from doing so by the nonreturn valve 17 acting as a shut-off element. A ball valve or lip valve, for example, is used as the nonreturn valve 17.

Figure 2:
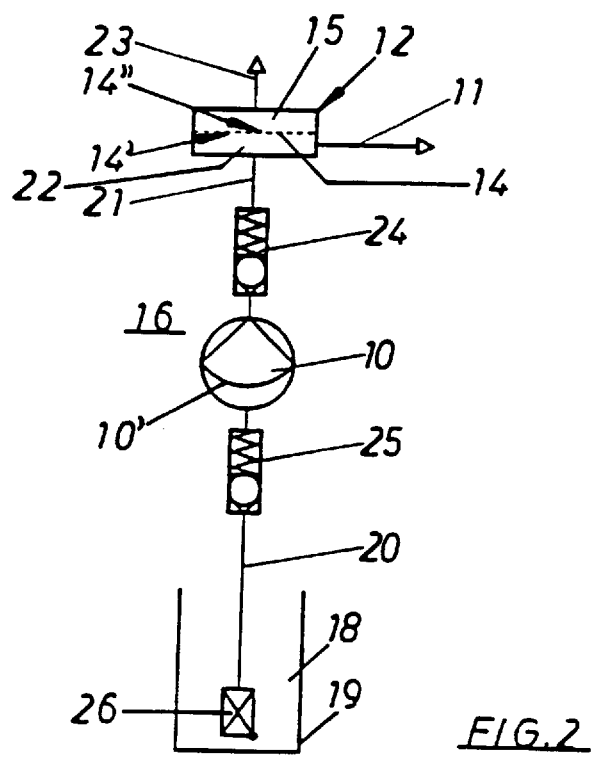
FIG. 2 schematically illustrates another special metering pump with a venting system.

FIG. 2 shows a special metering pump 10, namely a diaphragm pump, together with the pump valves normally used for such pumps, namely a pressure valve 24 on the output side of the pump and a suction valve 25 on the intake side of the pump. During its one stroke, the delivery diaphragm 10'—driven in known manner—draws liquid from the supply 18 through the suction pipe, the pressure valve 24 closing. When the diaphragm 10' moves in its other direction, the suction valve 25 closes and liquid is transported through the pressure valve 24 into the pressure pipe 11.

What is claimed is:

1. A metering pump for the measured delivery of liquids that contain gas from a supply into a metering pipe, comprising;

said metering pump being a suction pump producing cyclic variations in pressure at its ouptput side during the pressurization of a liquid;

a venting system connected to the output side of the pump to enable gas transported by the pressurized liquid being pumped to be removed in a degassing space where the pressure is below the liquid pressure and discharged, the venting system comprising a porous element which, on one side, is exposed to the pressurized liquid and which, on its other side, immediately adjoins the degassing space, and the degassing space being in gas discharge communication with the environment around the pump through a shut-off element, wherein the porous element is a semipermeable membrane that passes gas but prevents the passage of liquid, and the shut-off element is a nonreturn valve or a barrier liquid for preventing the penetration of gas, the nonreturn valve being open only if the gas pressure of the degassing space is higher than the pressure of the environment, and the nonreturn valve being closed only if the gas pressure of the degassing space is lower than the pressure of the environment.

2. A metering pump as claimed in claim 1, wherein the membrane is oleophobic.

3. A metering pump as claimed in claim 1 wherein the venting pressure of the degassing space is permanently lower to a predetermined extent than the pressure of the pumped liquid.

4. A metering pump as claimed in claim 1, wherein the degassing space is a gas-filled space.

5. A metering pump as claimed in claim 1, wherein the degassing space is at atmospheric pressure.

6. A metering pump as claimed in claim 1 wherein the venting system forms an integral unit with the pump head of the metering pump.

7. A metering pump as claimed in claim 1, wherein a diaphragm pump is used, the venting system forms an integral unit with its pump pressure valve.

8. A metering pump as claimed in claim 1, wherein the supply of liquid is under pressure, the metering pump is preceded on its suction side by a venting system comprising a semipermeable membrane which is exposed to the supply to be delivered and which, on its other side, immediately adjoins a degassing space where the pressure is below the pressure of the liquid supply.

* * * * *